(12) United States Patent
Paul et al.

(10) Patent No.: US 11,009,473 B2
(45) Date of Patent: May 18, 2021

(54) METHOD FOR DETERMINING A PHYSICAL AND/OR CHEMICAL, TEMPERATURE DEPENDENT, PROCESS VARIABLE

(71) Applicant: Endress + Hauser Conducta Gesellschaft für Mess-und Regeltechnik mbH + Co. KG, Gerlingen (DE)

(72) Inventors: Stefan Paul, Dobeln (DE); Stephan Buschnakowski, Chemnitz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 1327 days.

(21) Appl. No.: 14/480,689

(22) Filed: Sep. 9, 2014

(65) Prior Publication Data

US 2015/0081244 A1 Mar. 19, 2015

(30) Foreign Application Priority Data

Sep. 12, 2013 (DE) .................. 10 2013 110 046

(51) Int. Cl.
*G01K 7/18* (2006.01)
*G01N 27/07* (2006.01)
*G01N 27/02* (2006.01)

(52) U.S. Cl.
CPC ............ *G01N 27/07* (2013.01); *G01K 7/18* (2013.01); *G01N 27/028* (2013.01)

(58) Field of Classification Search
CPC ......... G01K 7/18; G01K 15/00; G01N 27/028
See application file for complete search history.

(56) References Cited

U.S. PATENT DOCUMENTS 5,544,531 A * 8/1996 Heckman ............... G01F 1/002
73/861
7,214,909 B2 5/2007 Reiter
(Continued)

FOREIGN PATENT DOCUMENTS

CN 1464972 A 12/2003
CN 103091375 A 5/2013
(Continued)

OTHER PUBLICATIONS

German Search Report, German PTO, Munich, dated Mar. 19, 2014.

*Primary Examiner* — Mohamed Charioui
*Assistant Examiner* — Eyob Hagos
(74) *Attorney, Agent, or Firm* — Christopher R. Powers; Endress+Hauser (USA) Holding Inc.

(57) ABSTRACT

A method for determining a physical and/or chemical, temperature dependent, process variable of process automation technology utilizing a resistance thermometer ($R_{Pt1000}$), wherein the resistance thermometer ($R_{Pt1000}$) is installed in an electrical circuit, comprising the steps of: measuring a first voltage (U1) across at least a first precision resistor (R1); measuring a second voltage (U2) across at least a second precision resistor (R2); measuring a third voltage (U3) across at least a third precision resistor (R3), wherein cyclically or continuously a constant electrical current (I) is sent through the at least first precision resistor (R1), the at least second precision resistor (R2) or the at least third precision resistor (R3); determining temperature coefficients (a, b, c) characteristic for the electrical circuit by means of the first voltage (U1), the second voltage (U2) and the third voltage (U3); sending the constant electrical current (I) through the resistance thermometer ($R_{Pt1000}$) and measuring a voltage (U) across the resistance thermometer ($R_{Pt1000}$); and determining the temperature (T) by means of the temperature coefficients (a, b, c) and the measured voltage (U).

(Continued)

An electrical circuit and a sensor of process automation technology, especially a conductivity sensor, comprising such an electrical circuit are also discussed.

14 Claims, 2 Drawing Sheets

(56) References Cited

U.S. PATENT DOCUMENTS

| | | | | |
|---|---|---|---|---|
| 7,832,257 | B2* | 11/2010 | Weightman | E21B 43/26 |
| | | | | 73/54.09 |
| 2002/0030499 | A1* | 3/2002 | Pan | G05D 23/306 |
| | | | | 324/721 |
| 2005/0285601 | A1* | 12/2005 | Seto | G01R 17/105 |
| | | | | 324/526 |
| 2010/0131211 | A1* | 5/2010 | Shipley | G01N 3/60 |
| | | | | 702/43 |
| 2011/0291129 | A1* | 12/2011 | Wirth | H05B 33/0857 |
| | | | | 257/89 |
| 2013/0125643 | A1* | 5/2013 | Batty | G01F 1/692 |
| | | | | 73/204.14 |
| 2014/0062533 | A1* | 3/2014 | Takayanagi | G06F 1/206 |
| | | | | 327/62 |

FOREIGN PATENT DOCUMENTS

| | | |
|---|---|---|
| DE | 102004035014 A1 | 2/2006 |
| DE | 102005062389 A1 | 6/2007 |
| EP | 0951635 A1 | 10/1999 |
| EP | 1619485 A1 | 1/2006 |
| EP | 2450684 A1 | 5/2012 |

* cited by examiner

METHOD FOR DETERMINING A PHYSICAL AND/OR CHEMICAL, TEMPERATURE DEPENDENT, PROCESS VARIABLE

TECHNICAL FIELD

The invention relates to a method for determining a physical and/or chemical, temperature dependent, process variable of process automation technology utilizing a resistance thermometer. The invention relates further to an electrical circuit and to a sensor of process automation technology, especially a conductivity sensor, comprising such an electrical circuit.

BACKGROUND DISCUSSION

Pure metals exhibit greater resistance changes than alloys and have a relatively constant temperature coefficient of electrical resistance. For precise measurements of temperature by means of a resistance thermometer, one uses noble metals, most often, platinum or nickel, since especially these show little aging, and since thermometers thereof can be manufactured with narrow tolerances. Temperature sensitive sensors can also be manufactured of a ceramic (sintered metal oxides) or a semiconductor material (silicon), whereby higher temperature coefficients than with metals and therewith also higher sensitivities can be achieved, however, with lesser precision and temperature dependence on the temperature coefficient.

A Pt1000 resistor is a resistor of a pure metal, most often, platinum. The Pt1000 resistor has a nominal resistance $R_0$ of 1000 Ω at a temperature T of 0° C. Alternatively, known in the state of the art are Pt100 and Pt500 resistors, wherein these have nominal resistances $R_0$ of 100 Ω, respectively 500 Ω, at a temperature T of 0° C. The standard (IEC 60751:2008) represents the characteristic curve for a Pt1000-platinum resistor with the formula (true for 0-850° C.):

$$R(T)=R_0(1+\alpha T+\beta T^2),$$

wherein R(T) is the temperature dependent resistance, and α as well as β0 represent known, standardized and fixed values.

For resistance measurement, a constant electrical current must flow through the resistor. The applied voltage is an easily measurable signal proportional to the resistance—and therewith to the temperature to be measured. Disadvantageous is that the value of the constant electrical current through the Pt1000 must be known.

The resistance is thus read-out via an electrical circuit, which comprises, for example, an analog to digital converter, amplifier, electrical current source, etc.

A problem in the case of determining a process variable is drift. The terminology, drift, refer to a relatively slow change of a value. Drift is, most often, undesirable. Especially to be taken into consideration is drift in the case of calibrating a sensor (e.g. in establishing a zero-point). The terminology, temperature drift, refers to the unintended change of a physical or chemical variable due to change of (ambient) temperature. Also, physical and chemical properties can change over the lifetime of the system and have an influence on the measuring.

While the temperature behavior of the resistance thermometer might be known, the measurement circuit (thus analog to digital converter, amplifier, electrical current source, etc.) can, in given cases, exhibit a quite different temperature behavior. Also, the temperature behavior of the resistance thermometer can, in fact, vary (e.g. due to self-warming). It is, consequently, desirable to know the temperature behavior of the total circuit exactly, especially when temperature represents a secondary variable, in order to measure a primary variable, such as pH-value, conductivity, etc., and these primary variables are temperature dependent. Generally, parameters, which are used in process automation, are highly temperature dependent.

SUMMARY OF THE INVENTION

An object of the invention is to provide a method and a circuit for determining a physical and/or chemical process variable, which method and circuit compensate the temperature dependence of the total system.

The object is achieved by a method utilizing a resistance thermometer, wherein the resistance thermometer is installed in an electrical circuit, comprising steps as follows: measuring a first voltage across at least a first precision resistor; measuring a second voltage across at least a second precision resistor; measuring a third voltage across at least a third precision resistor, wherein, cyclically or continuously, a constant electrical current is sent through the at least first precision resistor, at least second precision resistor or at least third precision resistor; determining temperature coefficients characteristic for the electrical circuit by means of the first voltage, second voltage and third voltage; sending the constant electrical current through the resistance thermometer and measuring a voltage across the resistance thermometer; determining the temperature by means of the temperature coefficients and the measured voltage; and determining the process variable taking temperature into consideration.

By ascertaining temperature coefficients characteristic for the electrical circuit, it is possible to determine the temperature behavior of the total circuit.

Preferably, these temperature coefficients are determined by solving the following linear system of equations:

$$U1 = a \cdot R1^2 + b \cdot R1 + c,$$

$$U2 = a \cdot R2^2 + b \cdot R2 + c \text{ and}$$

$$U3 = a \cdot R3^2 + b \cdot R3 + c.$$

It is then advantageous to determine the temperature of the total circuit via the equation $$T = -\frac{b}{2a} - \sqrt{\left(\frac{b}{2a}\right)^2 - \frac{c}{a} + \frac{U}{a}}.$$

The object is further achieved by an electrical circuit comprising: at least one resistance thermometer arranged in an electrical circuit; a first precision resistor; a second precision resistor; a third precision resistor; a constant current source, which cyclically or continuously sends a constant electrical current through the first precision resistor, second precision resistor, third precision resistor and/or resistance thermometer; a voltage meter, which measures a first voltage across at least the first precision resistor, a second voltage across at least the second precision resistor, a third voltage across at least the third precision resistor and a voltage across the resistance thermometer, wherein, in each case, electrical current flows through the first precision resistor, the second precision resistor, the third precision resistor and/or the resistance thermometer; and a data processing unit, which determines by means of the first voltage, second voltage and third voltage temperature coefficients characteristic for the electrical circuit, which determines temperature by means of the temperature coefficients and the measured voltage, and which determines the process variable taking the temperature into consideration.

Preferably, the data processing unit ascertains the temperature coefficients by solving the linear equation system:

$$U1=a \cdot R1^2+b \cdot R1+c,$$

$$U2=a \cdot R2^2+b \cdot R2+c \text{ and}$$

$$U3=a \cdot R3^2+b \cdot R3+c.$$

The temperature of the total circuit is advantageously determined by the data processing unit via the equation:

$$T = -\frac{b}{2a} - \sqrt{\left(\frac{b}{2a}\right)^2 - \frac{c}{a} + \frac{U}{a}}$$

In a preferred embodiment, the electrical circuit includes a switch, especially an MOS, analog switch, wherein the switch switches the electrical current between the at least first precision resistor, the at least second precision resistor, the at least third precision resistor and/or the resistance thermometer.

It is, thus, assured that electrical current flows through the appropriate resistor, in order then to measure the voltage falling thereacross.

Alternatively, the electrical circuit includes a demultiplexer, wherein the demultiplexer switches the electrical current to the at least first precision resistor, the at least second precision resistor, the at least third precision resistor and/or the resistance thermometer, and wherein the electrical circuit further includes a multiplexer, wherein the multiplexer so taps the first voltage across the at least first precision resistor the second voltage across the at least second precision resistor, the third voltage across the at least third precision resistor or the voltage across the resistance thermometer that the voltage meter measures the first voltage, the second voltage, the third voltage or the voltage across the resistance thermometer.

In an advantageous form of embodiment, the electrical circuit further includes at least one analog to digital converter and/or amplifier.

The object is further achieved by a sensor of process automation technology, especially a conductivity sensor, comprising an electrical circuit described above.

BRIEF DESCRIPTION OF THE DRAWINGS

The invention will now be explained in greater detail based on the drawing, the figures of which show as follows.

DETAILED DISCUSSION IN CONJUNCTION WITH THE DRAWINGS

Figure 1:
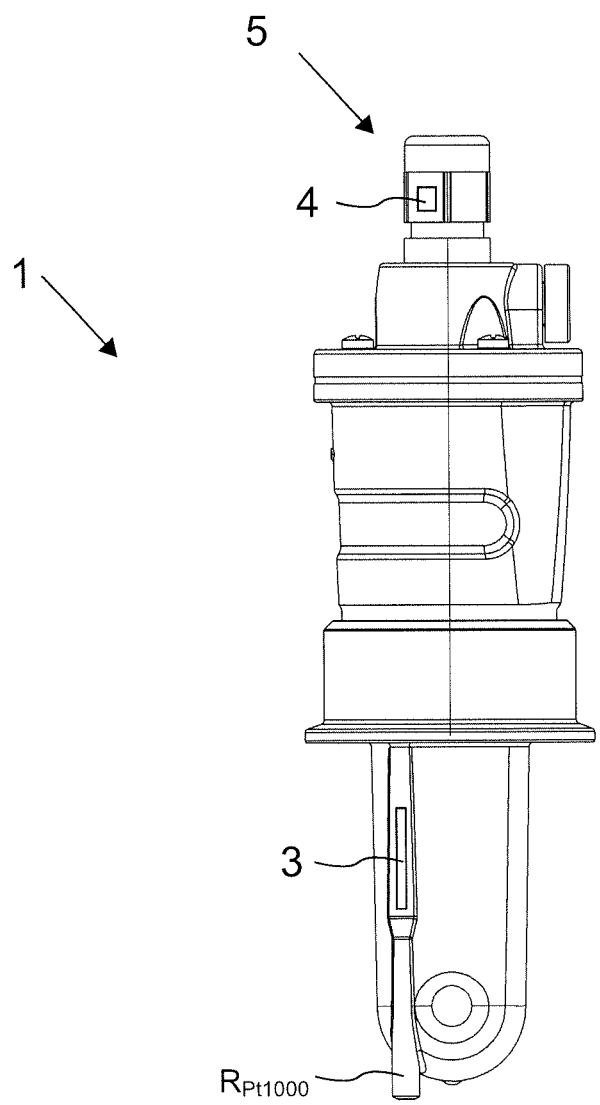
FIG. 1 is a conductivity sensor of the invention.

In the figures, equal features are provided with equal reference characters.

The invention will be explained based on a conductivity sensor 1 as shown in FIG. 1. The basic idea is, however, also applicable to other types of sensors for measuring a physical or chemical, process variable. The sensors are predominantly used in the field of process automation. Thus, the most varied of sensors may be used for measuring various parameters of a medium 5, wherein these are, in general, temperature dependent. In this regard, the sensor is located in, or partially in, the medium to be measured 5 or is at least in contact with the medium to be measured 5. Conventional sensors include, in such case, pH-, oxygen-, turbidity-, ammonium-, chlorine- and conductivity sensors, etc. The basic principle of a conductivity sensor is known. Measurement of conductivity is highly temperature dependent, so that each conductivity sensor includes also a resistance thermometer $R_{Pt1000}$ for determining the temperature of the medium 5. The conductivity sensor 1 includes further a data processing unit 4, which takes the currently measured temperature value into consideration in determining the conductivity.

The conductivity sensor 1 is connected, for instance, via a galvanically isolated interface 5, especially an inductive interface, with a measurement transmitter (not shown), for instance, via a cable. The measurement transmitter, in turn, is connected via a bus connection such as a Fieldbus Foundation, ModBus, HART bus or the like to a control system. Alternatively, the conductivity sensor 1 can also be connected directly via a bus connection to a control system.

The resistance thermometer $R_{Pt1000}$ is preferably embodied as a Pt1000 resistor. Pt100 and Pt500 resistors provide other options. In general, the resistance thermometer $R_{Pt1000}$ is a temperature dependent resistance. Frequently, a platinum resistor is used.

For measuring the resistance, a constant electrical current I is sent through the resistance thermometer $R_{P1000}$. The measured voltage U is then proportional to the temperature T. Different measuring circuits are known to be used for evaluation, for instance, a bridge circuit (e.g. Wheatstone bridge), two, three or four conductor circuit. A four conductor circuit is applied, when line and connection resistances can corrupt the measuring. In the four-conductor measuring arrangement, a known electrical current is sent, via two of the lines, through the resistor. The voltage falling across the resistor is tapped high resistantly via two other lines and measured with a voltage measuring device; the resistance to be measured is calculated therefrom using Ohm's law. The measured voltage is frequently amplified and converted by an analog to digital converter (each not shown). The mentioned components, thus precision resistors R1, R2, R3, electrical current source, voltage measurement, amplifier, analog to digital converter, as well as, in given cases, data processing unit 4, multiplexer and demultiplexer (see below), etc., should all be contained in an electrical circuit 3.

The resistance temperature characteristic curve for a platinum Pt1000 resistor is $R(T)=R_0(1+\alpha T+\beta T^2)$, with the nominal resistance $R_0=1000 \, \Omega$ and the known, normalized and constant parameters $\alpha$ and $\beta$. Through multiplication with Ro and taking into consideration that a constant electrical current is used, one can convert the above formula to a voltage temperature characteristic curve $$U(T)=a \cdot T^2+b \cdot T+c,$$

wherein a, b, c represent general parameters. The parameters $\alpha$ and $\beta$ are contained in this general form. All inaccuracies of the circuit 3 can be compensated in this formula by the parameters a, b and c. Thus, the quadratic Pt1000 function is described not by its ideal material properties $\alpha$ and $\beta$, but, instead, at a higher level of abstraction.

Figure 2:
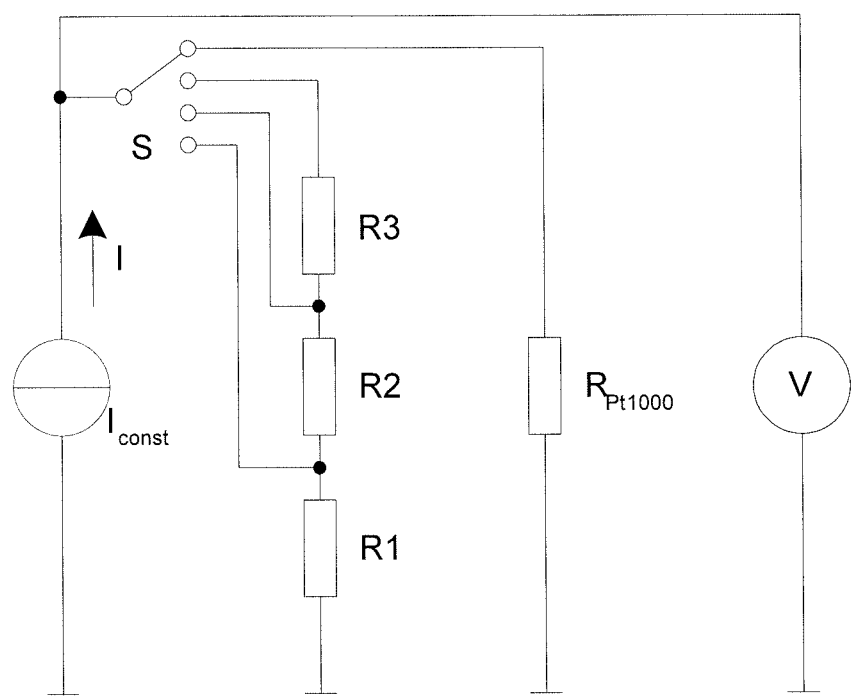
FIG. 2 is a schematic representation of the circuit of the invention.

FIG. 2 shows a schematic representation of the electrical circuit 3 of the invention.

Circuit 3 includes, such as already mentioned, a constant current source (const, which delivers a constant electrical current I, voltage meter V, the resistance thermometer $R_{Pt1000}$, as well as additionally at least a first precision resistor R1, second precision resistor R2, third precision resistor R3 and a switch S. Switch S is embodied, for example, as an MOS, analog switch. Other variants are, however, available. For example, one option is to use a demultiplexer, which distributes the electrical current I sequentially to the individual precision resistors R1, R2, R3. Moreover, a multiplexer is used, which enables the voltage meter V (for voltage measurement see below) to measure the voltage individually across each selected precision resistor.

An idea of the invention lies therein, so to switch the precision resistors R1, R2, R3, that the parameters a, b, c can be determined, in order, in that way, to be able to determine the temperature behavior of the total circuit 3.

Sequentially, the switch S is so operated that electrical current I flows through the precision resistors R3, R2 and R1, then only through the precision resistors R2 and R1 and lastly only through the precision resistor R1.

The precision resistors R1, R2, R3 have, for example, the values 1000 Ω, 390 Ω and 390 Ω and a tolerance of ±0.1%. Preferably, SMD components are used.

In the circuit example in FIG. 2, the three precision resistors R1, R2, R3 form, as mentioned above, a series circuit. There result from the switching, thus, the resistance values of 1000 Ω (only R1), 1390 Ω (R1+R2) and 1780 Ω (R1+R2+R3). The single precision resistor, respectively the combinations of precision resistors, represents/represent a certain temperature, in this case, thus, 0° C., 101.304° C. and 205.836° C.

In each case, the falling voltage U3, U2, U1 is measured. With little effort for changing the circuit, alternatively, electrical current can be sent only through a respective single precision resistor, thus R3 or R2 or R1. Control of the switch S is done using a data processing unit 2, thus e.g. a microcontroller, or a multiplexer.

With the known resistance values and the measured voltages U1, U2, U3, the parameters a, b, c can be determined by solving the linear system of equations via the data processing unit 4 as follows:

$$a = \frac{R1 \cdot (U2 - U3) + R2 \cdot (U3 - U1) + R3 \cdot (U1 - U2)}{(R1 - R2) \cdot (R1 - R3) \cdot (R3 - R2)},$$

$$b = \frac{R1^2 \cdot (U2 - U3) + R2^2 \cdot (U3 - U1) + R3^2 \cdot (U1 - U2)}{(R1 - R2) \cdot (R1 - R3) \cdot (R2 - R3)} \text{ and}$$

$$c = \frac{R1^2 \cdot \left(\frac{R2 \cdot U3 -}{R3 \cdot U2}\right) + R1 \cdot \left(\frac{R3^2 \cdot U2 -}{R2^2 \cdot U3}\right) + R2 \cdot R3 \cdot U1 \cdot (R2 - R3)}{(R1 - R2) \cdot (R1 - R3) \cdot (R2 - R3)}.$$

With the calculated values for the parameters a, b, c and a measured Pt1000 voltage U (switch S switches to $R_{Pt1000}$), the temperature T of the medium 5 can be calculated directly based on the measured voltage U. The (plausible) solution of the above discussed voltage temperature characteristic curve becomes $$T = -\frac{b}{2a} - \sqrt{\left(\frac{b}{2a}\right)^2 - \frac{c}{a} + \frac{U}{a}}.$$

Thus, it becomes possible to enter the temperature characteristic of the entire circuit 3 into the determining of the temperature of the medium 5, in order so to assure that always the currently correct temperature is present for determining the primary variable.

Such an adjustment can be performed, for example, once during the production or directly on-site continuously at the conductivity sensor 1. The latter variant offers the advantage that component tolerances can be compensated dynamically over the course of time. This holds true e.g. for the temperature drift of components such as analog to digital converter, amplifier and electrical current source. Such an adjustment can be performed, for instance, every few seconds or upon demand.

The inention claimed is:

1. A method for autocorrecting a temperature-dependent, process variable of a process medium, the method comprising:
providing an electrical circuit including:
a first precision resistor having a known first resistance;
a second precision resistor having a known second resistance, the second resistance different than the first resistance;
a third precision resistor having a known third resistance; and
a resistance thermometer having a temperature-dependent resistance;
measuring a first voltage across the first precision resistor using a constant electrical current;
measuring a second voltage across at least the second precision resistor using the constant electrical current;
measuring a third voltage across at least the third precision resistor using the constant electrical current, wherein cyclically or continuously the constant electrical current is passed through said first precision resistor, said second precision resistor and said third precision resistor;
calculating temperature coefficients characteristic for the electrical circuit using said first voltage, said second voltage and said third voltage;
passing the constant electrical current through said resistance thermometer and measuring a fourth voltage across said resistance thermometer, the fourth voltage proportional to a temperature;
autocorrecting the temperature using the calculated temperature coefficients and the measured fourth voltage, wherein the autocorrected temperature is calculated using the equation:

$$T = -\frac{b}{2a} - \sqrt{\left(\frac{b}{2a}\right)^2 - \frac{c}{a} + \frac{U}{a}},$$

wherein T is the autocorrected temperature, U is the fourth voltage, and a, b and c are the temperature coefficients;
measuring the process variable using a sensor of process automation; and
adjusting the measured process variable using the autocorrected temperature to correct for the temperature dependency of the process variable.

2. The method as claimed in claim 1, wherein:
the temperature coefficients are calculated by solving the linear system of equations:

$$U1 = a \cdot R1^2 + b \cdot R1 + c,$$

$$U2 = a \cdot R2^2 + b \cdot R2 + c, \text{ and}$$

$$U3 = a \cdot R3^2 + b \cdot R3 + c,$$

wherein U1 is the first voltage, U2 is the second voltage, U3 is the third voltage, R1 is a resistance of the first precision resistor, R2 is a resistance of the second precision resistor, and R3 is a resistance of the third precision resistor.

3. The method of claim 1, wherein the second precision resistor is arranged in series with the first precision resistor, the third precision resistor is arranged in series with the second precision resistor and the first precision resistor, and the resistance thermometer is arranged in parallel with the first precision resistor, second precision resistor and third precision resistor.

4. The method of claim 1, wherein the process variable is a conductivity, a pH, a turbidity, an oxygen concentration, an ammonia concentration or a chlorine concentration.

5. An electrical circuit for autocorrecting a temperature-dependent, process variable of a process medium, comprising:
   a resistance thermometer having a temperature-dependent resistance;
   a first precision resistor having a known first resistance;
   a second precision resistor having a known second resistance, the second resistance different than the first resistance;
   a third precision resistor having a known third resistance;
   a constant current source configured to cyclically or continuously pass a constant electrical current through the first precision resistor, the second precision resistor, the third precision resistor and/or the resistance thermometer;
   a voltage meter configured to measure a first voltage across the first precision resistor, a second voltage across the second precision resistor, a third voltage across the third precision resistor and a fourth voltage across said resistance thermometer, wherein, in each case, the constant electrical current is passed through said first precision resistor, said second precision resistor, said third precision resistor and/or the resistance thermometer; and
   a data processing unit configured to:
      calculate, using said first voltage, said second voltage and said third voltage, temperature coefficients characteristic for the electrical circuit;
      autocorrect a process temperature using the temperature coefficients and said fourth voltage; and
      adjust the process variable determined using a sensor of process automation based on the autocorrected process temperature to correct for temperature dependency of the process variable,
   wherein the autocorrected process temperature is calculated using the equation:

$$T = -\frac{b}{2a} - \sqrt{\left(\frac{b}{2a}\right)^2 - \frac{c}{a} + \frac{U}{a}},$$

wherein T is the process temperature, U is the fourth voltage, and a, b and c are the temperature coefficients.

6. The electrical circuit as claimed in claim 5, wherein:
   said data processing unit calculates the temperature coefficients by solving the linear equation system:

$$U1 = a \cdot R1^2 + b \cdot R1 + c,$$

$$U2 = a \cdot R2^2 + b \cdot R2 + c, \text{ and}$$

$$U3 = a \cdot R3^2 + b \cdot R3 + c,$$

wherein U1 is the first voltage, U2 is the second voltage, U3 is the third voltage, R1 is a resistance of the first precision resistor, R2 is a resistance of the second precision resistor, and R3 is a resistance of the third precision resistor.

7. The electrical circuit as claimed in claim 5, wherein:
   the electrical circuit includes a switch.

8. The electrical circuit as claimed in claim 7, wherein:
   said switch is configured to switch the electrical current between said first precision resistor, said second precision resistor, said third precision resistor and/or the resistance thermometer.

9. The electrical circuit as claimed in claim 5, wherein:
   the electrical circuit includes a demultiplexer, wherein:
   said demultiplexer is configured to switch the electrical current to said first precision resistor, said second precision resistor, said third precision resistor and/or the resistance thermometer; and
   the electrical circuit includes a multiplexer, said multiplexer is configured to select said first voltage across said first precision resistor, said second voltage across said second precision resistor, said third voltage across said third precision resistor or the fourth voltage across the resistance thermometer that said voltage meter measures said first voltage, said second voltage, the third voltage or the fourth voltage across said resistance thermometer.

10. The electrical circuit as claimed in claim 5, wherein:
    the electrical circuit further includes at least one analog to digital converter and/or amplifier.

11. A conductivity sensor of process automation technology, comprising an electrical circuit as claimed in claim 5.

12. The electrical circuit as claimed in claim 7, wherein:
    the switch is a MOS analog switch.

13. The electrical circuit of claim 5, wherein the second precision resistor is arranged in series with the first precision resistor, the third precision resistor is arranged in series with the second precision resistor and the first precision resistor, and the resistance thermometer is arranged in parallel with the first precision resistor, second precision resistor and third precision resistor.

14. The electrical circuit of claim 5, wherein the process variable is a conductivity, a pH, a turbidity, an oxygen concentration, an ammonia concentration or a chlorine concentration.

* * * * *